United States Patent
Minh

(10) Patent No.: US 8,614,573 B2
(45) Date of Patent: Dec. 24, 2013

(54) ESTIMATING POROSITY AND FLUID VOLUME

(75) Inventor: Chanh Cao Minh, Katy, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 522 days.

(21) Appl. No.: 12/886,962

(22) Filed: Sep. 21, 2010

(65) Prior Publication Data

US 2011/0068788 A1    Mar. 24, 2011

Related U.S. Application Data

(60) Provisional application No. 61/245,103, filed on Sep. 23, 2009.

(51) Int. Cl.
*G01V 3/00*    (2006.01)

(52) U.S. Cl.
USPC .......................................... 324/303

(58) Field of Classification Search
USPC ................................. 324/300–322
See application file for complete search history.

(56) References Cited

U.S. PATENT DOCUMENTS

| | | | |
|---|---|---|---|
| 6,541,969 B2 * | 4/2003 | Sigal et al. ................ | 324/303 |
| 6,559,639 B2 * | 5/2003 | Minh et al. ................ | 324/303 |
| 6,690,167 B2 * | 2/2004 | Reiderman et al. ....... | 324/314 |
| 6,903,547 B2 * | 6/2005 | Sigal et al. ................ | 324/303 |
| 6,956,371 B2 * | 10/2005 | Prammer ................... | 324/303 |
| 7,032,661 B2 * | 4/2006 | Georgi et al. ............. | 166/250.01 |
| 7,135,862 B2 * | 11/2006 | Hagiwara ................. | 324/303 |
| 7,463,027 B2 * | 12/2008 | Prammer et al. .......... | 324/303 |
| 7,733,086 B2 * | 6/2010 | Prammer et al. .......... | 324/303 |
| 8,330,459 B2 * | 12/2012 | Kruspe et al. ............ | 324/303 |

* cited by examiner

*Primary Examiner* — Dixomara Vargas
(74) *Attorney, Agent, or Firm* — Kenneth Liu

(57) ABSTRACT

The present disclosure relates to a method to estimate a subsurface formation property. A downhole logging tool is provided and disposed in a wellbore. Multiple measurements of various measurement types are obtained at various depths of investigation using the downhole logging tool. The multiple measurements may include natural gamma ray measurements, density measurements, resistivity measurements, nuclear measurements, and nuclear magnetic resonance measurements. The signal-to-noise ratio of the measured signals is increased using, for example, lateral stacking and multi-shell inversion. The subsurface formation property is estimated using the increased signal-to-noise ratio signals. The subsurface formation property may include porosity, adsorbed gas volume, free gas volume, bound water volume, free water volume, oil volume, and kerogen volume. A fluid analysis may be performed using a multi-dimensional nuclear magnetic resonance technique. Fluids such as water, oil, gas, and oil-based mud in the wellbore may be identified and/or evaluated.

19 Claims, 4 Drawing Sheets

Track 1

Track 2

US 8,614,573 B2

ESTIMATING POROSITY AND FLUID VOLUME

CROSS-REFERENCE TO OTHER APPLICATIONS

This application claims, under 35 U.S.C. 119(e), priority to and the benefit of U.S. Provisional Application No. 61/245,103, filed Sep. 23, 2009.

BACKGROUND

1. Technical Field

The present disclosure relates generally to the logging of subsurface formations surrounding a wellbore using a downhole logging tool, and particularly to using the logs to estimate one or more formation properties.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions (e.g., T1 and T2). MWD and LWD tools often have components common to wireline tools (e.g., transmitting and receiving antennas), but MWD and LWD tools must be constructed to not only endure but to operate in the harsh environment of drilling.

Determining fluid types from continuous nuclear magnetic resonance multi-dimensional logging can be accomplished in certain situations, such as where the signal-to-noise ratio is relatively high. However, this technique has not been possible to be applied to tight shale gas formations because of the low signal-to-noise ratio associated with such formations. For example, the free fluid volume in shale is typically small and the gas therein may not completely polarize. Furthermore, there is a low hydrogen index. Those factors contribute to a weak measured signal while the noise level is generally high because of high formation temperatures, thereby making the signal-to-noise ratio unfavorable to continuous nuclear magnetic resonance logging.

A logging tool such as Schlumberger's ECOSCOPE tool is capable of measuring multiple depths of investigation ranging from about 6 inches to 12 inches into the formation. There is a need to determine porosity and individual fluid volumes and saturations such as adsorbed and free gas, oil, oil-based mud filtrate, and bound and free water in low porosity shale gas formations from NMR multi-dimensional logging data. There is similarly a need to determine the kerogen volume in the formation.

SUMMARY

The present disclosure relates to a method to estimate a subsurface formation property. A downhole logging tool is provided and disposed in a wellbore. Multiple measurements of various measurement types are obtained at various depths of investigation using the downhole logging tool. The multiple measurements may include natural gamma ray measurements, density measurements, resistivity measurements, nuclear measurements, and nuclear magnetic resonance measurements. The signal-to-noise ratio of the measured signals is increased using, for example, lateral stacking and multi-shell inversion. The subsurface formation property is estimated using the increased signal-to-noise ratio signals. The subsurface formation property may include porosity, adsorbed gas volume, free gas volume, bound water volume, free water volume, oil volume, and kerogen volume. A fluid analysis may be performed using a multi-dimensional nuclear magnetic resonance technique. Fluids such as water, oil, gas, and oil-based mud in the wellbore may be identified and/or evaluated.

Other aspects and advantages will become apparent from the following description and the attached claims. The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION

Some embodiments will now be described with reference to the figures Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
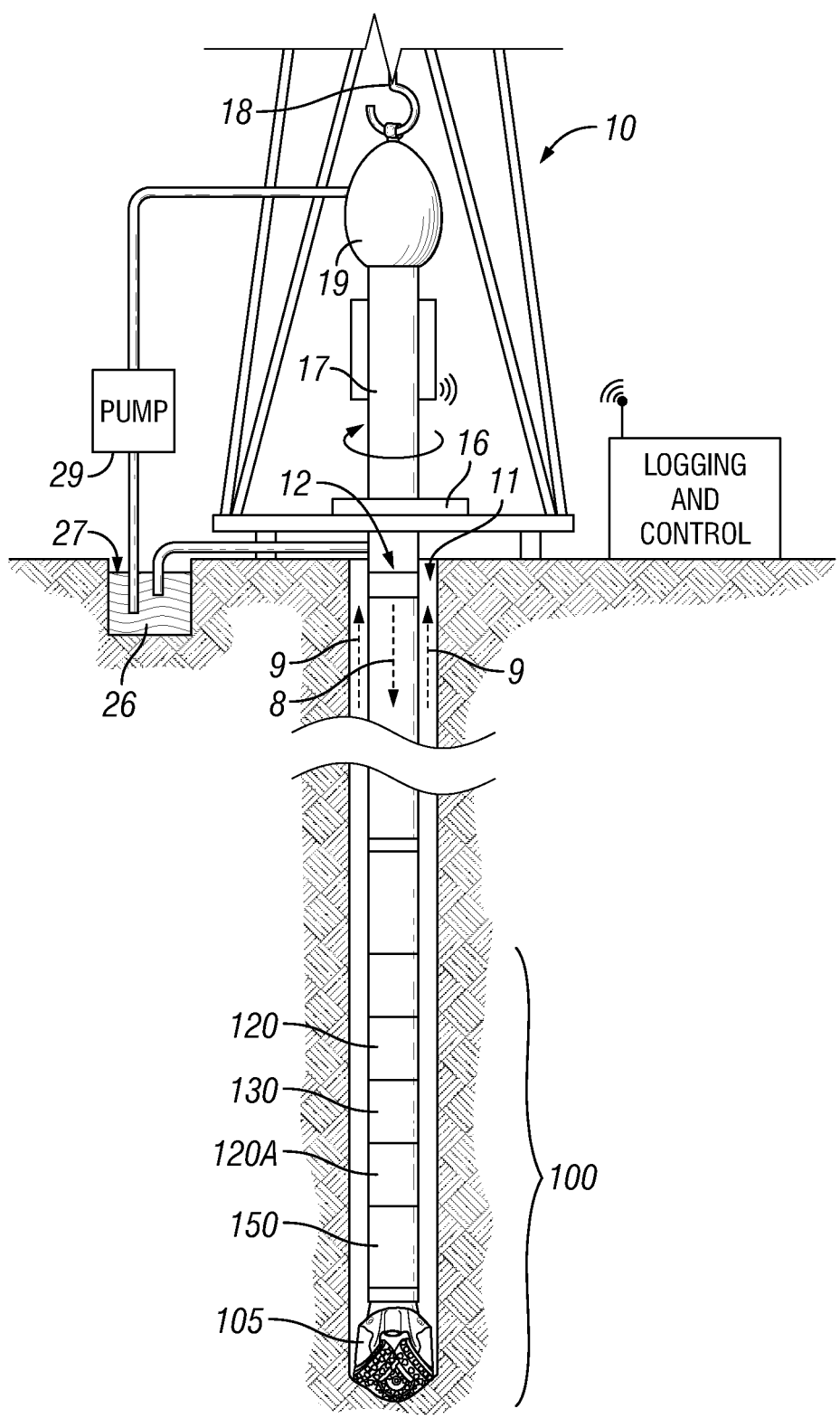
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Electromagnetic logging tools can use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

Figure 2:
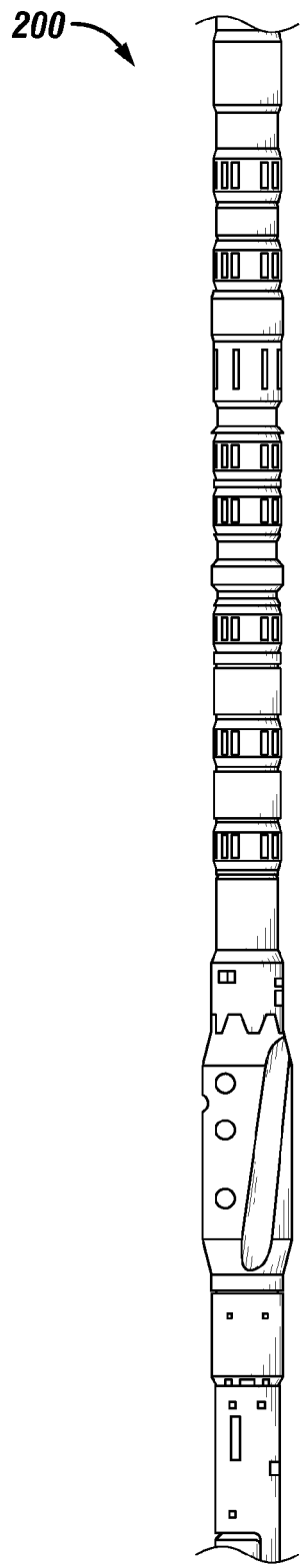
FIG. 2 shows a prior art downhole logging tool.

An example of a tool that can be the LWD tool 120, or can be a part of an LWD tool suite 120A of the system and method hereof, is Schlumberger's ECOSCOPE tool, as shown in FIG. 2. Such tools may have onboard or surface processors that control or assist in controlling an operation.

While applicable to various logging techniques, one embodiment of the present disclosure is applicable to a logging while drilling tool of the type shown in FIG. 2. Although the tool itself is shown as a single collar 200, it can be considered to have multiple distinct measurement devices to measure, for example, resistivity, thermal neutron porosity, hydrogen indices, density, spectroscopy, capture cross section (Sigma), borehole diameter (ultrasonic caliper), azimuthal density/PEF density, azimuthal formation natural gamma ray, and drilling dynamics (e.g., inclination, pressure, etc.). The tool may further comprise a pulsed neutron generator (PNG) with all the sensors required for the various related nuclear measurements, including near and far neutron detectors. The tool may comprise a first gamma ray detector (SSn) that is used for gamma ray spectroscopy, the sigma measurement, and the neutron gamma density measurement; and a second gamma ray detector (LSn) that provides the primary input for the neutron gamma density measurement.

In one embodiment, multiple passes of multi-shell, multi-dimensional nuclear magnetic resonance data are acquired. For a particular depth of investigation, various measurements can be made in which the polarization wait times and/or the echo spacings in the pulse sequence are varied. The raw nuclear magnetic resonance echoes of the multiple passes are preferably laterally stacked to improve the signal-to-noise ratio. The laterally-stacked data may be combined using a multi-shell inversion scheme to further improve the signal-to-noise ratio.

Figure 3A:
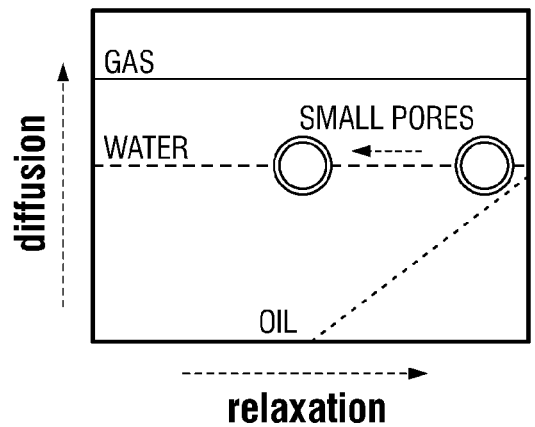
FIGS. 3A and 3B are plots showing diffusion versus relaxation times for water and gas, in accordance with one embodiment in the present disclosure.
Figure 3B:
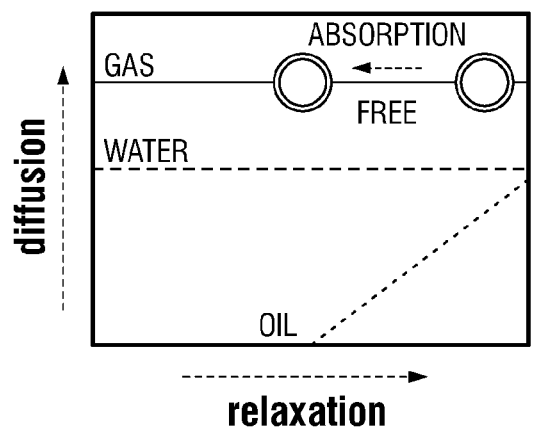
Figure 4A:
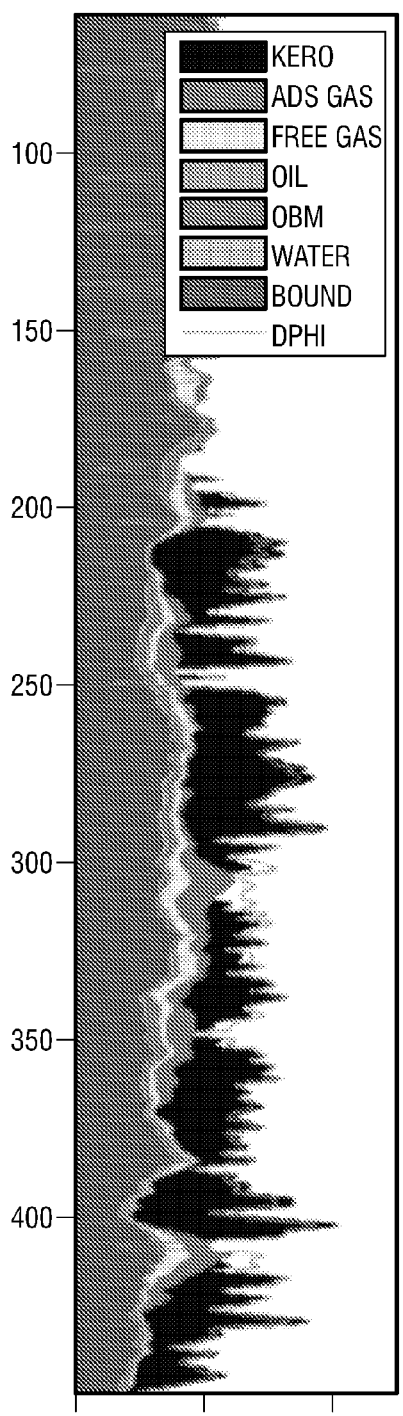
FIG. 4 illustrates a detailed fluid analysis, in accordance with one embodiment in the present disclosure.
Figure 4B:
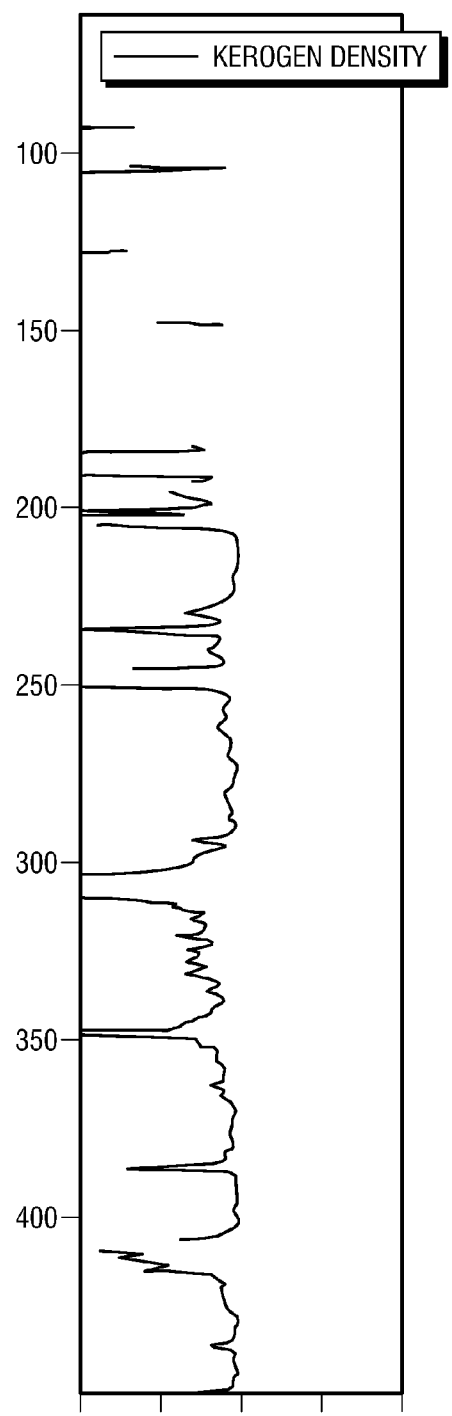
Figure 4C:
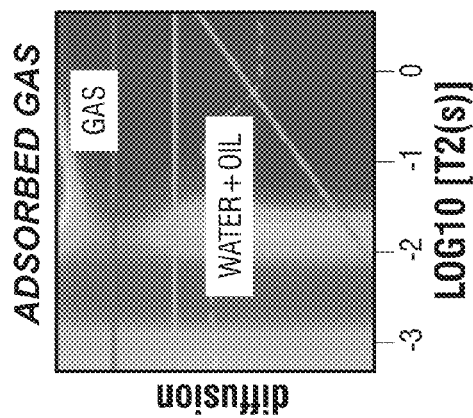
Figure 4D:
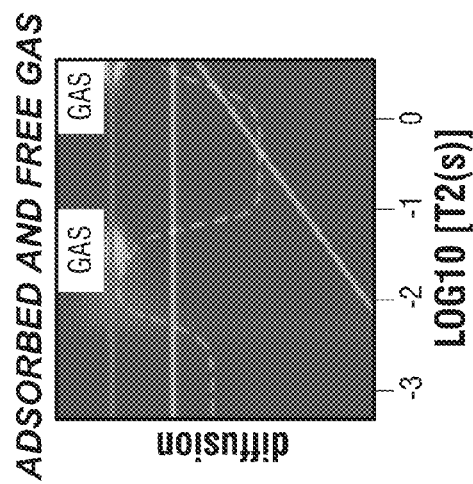
Figure 4E:
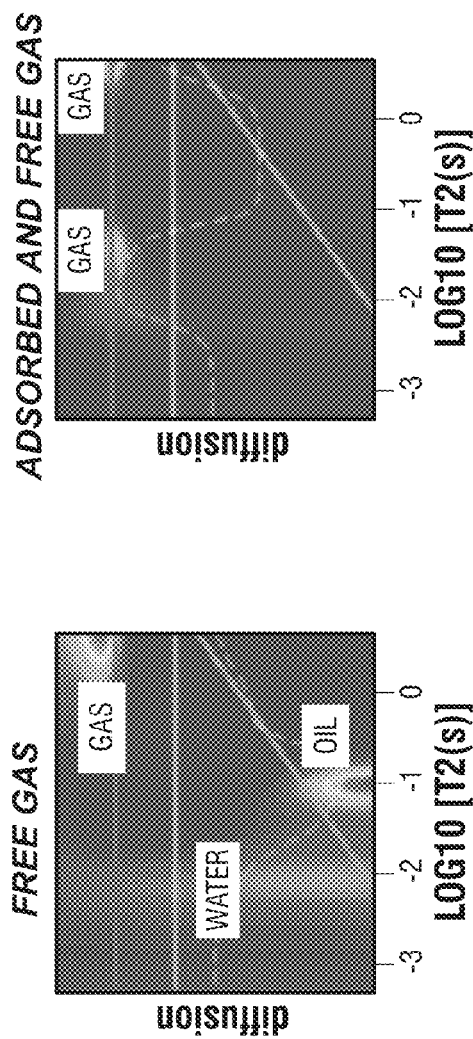

Multi-dimensional nuclear magnetic resonance techniques such as relaxation versus diffusion (e.g., D-T2 maps) can identify and evaluate various fluids such as water, oil, gas, and oil-based mud in a downhole formation. Similar to the case of increased surface relaxation effects that shift the relaxation time of water in large pores to shorter times for water contained in small pores, adsorbed gas has an added surface relaxation effect compared to free gas and therefore has a shorter relaxation time. FIG. 3A illustrates that water in small pores has a shorter relaxation time than water in large pores due to the increased surface relaxation effect. Similarly, FIG. 3B illustrates that adsorbed gas has a shorter relaxation time than free gas because of the increased surface relaxation effect, analogous to the well-understood water case. That effect or trait allows one to separate the adsorbed gas from the free gas, manifested as separate peaks in the D-T2 map, for example.

FIG. 4 shows a detailed analysis of fluid volumes including bound water, free water, oil-based mud filtrate, heavy oil, free gas, adsorbed gas, and kerogen. Three particular portions corresponding to three different wellbore depths are shown in the three D-T2 maps. The D-T2 map labeled "Adsorbed gas" (FIG. 4E) shows a single peak above the gas line corresponding to adsorbed gas. The D-T2 map labeled "Adsorbed and free gas" (FIG. 4D) shows two peaks on the gas line: the left peak corresponds to adsorbed gas and the right peak corresponds to free gas. The difference in their relaxation times separates the peaks. The D-T2 map labeled "Free gas" (FIG. 4C) shows a single peak just above the gas line that corresponds to free gas.

Figure 5:
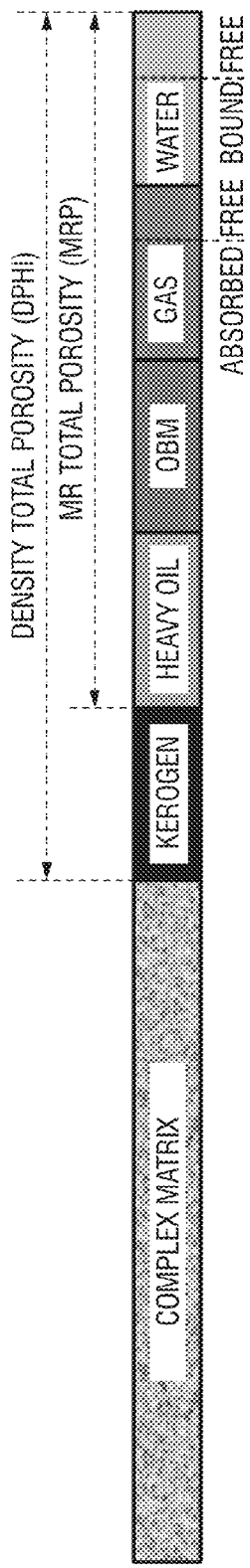
FIG. 5 is a porosity model, in accordance with one embodiment in the present disclosure.

Referring to the porosity model shown in FIG. 5, porosity may be determined from a nuclear magnetic resonance measurement as the sum of all the individual fluid volumes, excluding kerogen, corrected for their respective hydrogen indices. The kerogen volume is equal to the difference between total porosity determined from a source such as density, density-neutron, or sonic and total porosity determined from a nuclear magnetic resonance measurement.

If the kerogen density is input, the porosity model shows that the volume of kerogen can be computed as shown in the $1^{st}$ track of FIG. 4. If the average fluid density is input, the porosity model shows that the kerogen density can be computed as shown in the $2^{nd}$ track of FIG. 4.

Examples of formations in which the disclosed method may be used include gas-bearing or gas-adsorbed shales and coal beds.

It should be appreciated that while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to determine a subsurface formation property of an earth formation, comprising:
    disposing a logging tool in a wellbore that penetrates the formation;
    using the logging tool to measure signals corresponding to one or more measurement types, the one or more measurement types including at least multiple passes of nuclear magnetic resonance (NMR) measurement data measured at each of a plurality of depths of investigation, wherein the measured signals have an initial signal-to-noise ratio;
    using a processor to:
        increase the signal-to-noise ratio of the measured signals by laterally stacking the multiple passes of the NMR measurement data to obtain the laterally stacked NMR measurement data having a higher signal-to-noise ratio than the initial signal-to-noise ratio, performing a fluid volume analysis of the formation based upon the increased signal-to-noise ratio signals, determining the subsurface formation property based upon the fluid volume analysis, and providing the determined surface formation property to a user.

2. The method of claim 1, wherein the subsurface formation property includes at least one of porosity, adsorbed gas volume, free gas volume, bound water volume, free water volume, oil volume, kerogen density, and kerogen volume.

3. The method of claim 1, wherein disposing the logging tool in the wellbore comprises running the logging tool into and/or out of the wellbore.

4. The method of claim 1, wherein the obtaining the measured signals corresponding to one or more measurement types comprises making one or more natural gamma ray measurements, one or more density measurements, one or more resistivity measurements, and/or one or more nuclear measurements, in addition to the multiple passes of NMR measurements data at each of the plurality of depths of investigation.

5. The method of claim 1, wherein obtaining multiple measurements comprises making two or more measurements of a measurement type at two or more depths of investigation.

6. The method of claim 1, wherein increasing the signal-to-noise ratio of the measured signals comprises combining the laterally stacked data using a multi-shell inversion.

7. The method of claim 1, wherein the fluid volume analysis is performed using a multi-dimensional nuclear magnetic resonance technique.

8. The method of claim 7, wherein the multi-dimensional nuclear magnetic resonance technique comprises using a diffusion versus relaxation time map.

9. The method of claim 7, wherein performing the fluid volume analysis comprises identifying and/or evaluating at least one of water, oil, gas, or oil-based mud in the wellbore.

10. The method of claim 1, wherein the subsurface formation property is the kerogen volume and determining the subsurface formation property comprises determining a difference between a total porosity determined from a density, density-neutron, or sonic measurement and a total porosity determined from a nuclear magnetic resonance measurement using the fluid volume analysis.

11. The method of claim 1, wherein the subsurface formation property comprises a kerogen density and estimating the subsurface formation property comprises using a porosity model and an average fluid density.

12. The method of claim 11, wherein the porosity model allows for porosity to be determined from the NMR measurement data as the sum of all individual fluid volumes corrected for their respective hydrogen indices, but excluding kerogen.

13. The method of claim 1, wherein the formation comprises at least one of gas-bearing shale or coal.

14. The method of claim 1, wherein the NMR measurement data comprises diffusion measurements and transverse relaxation time (T2) measurements.

15. The method of claim 1, wherein the NMR measurement data comprises spin echoes.

16. A system comprising:
    a downhole logging tool capable of making multiple types of measurements in an earth formation at each of a plurality of depths of investigation, the one or more measurement types including at least multiple passes of nuclear magnetic resonance (NMR) measurement data measured at each of the plurality of depths of investigation, wherein the NMR measurement data has an initial signal-to-noise ratio; and
    a processor for performing steps comprising:
    increasing a signal-to-noise ratio of the NMR measurement data by laterally stacking the multiple passes of the NMR measurement data to obtain the laterally stacked NMR measurement data having a higher signal-to-noise ratio than the initial signal-to-noise ratio;
    determining a subsurface formation property based at least partially upon a fluid volume analysis performed using the increased signal-to-noise ratio signals, and providing the determined surface formation property to a user.

17. The system of claim 16, wherein the logging tool is disposed on a wireline, a drill string, or a wired drill pipe.

18. The system of claim 17, wherein the downhole logging tool comprises a measuring-while-drilling (MWD) and/or a logging-while-drilling (LWD) module.

19. A system having non-transitory computer-readable medium having a set of computer-readable instructions encoded thereon that, when executed, perform acts comprising:
    causing a downhole logging tool to measure signals corresponding to one or more measurement types in a subsurface formation at each of multiple depths of investigation, wherein the one or more measurement types includes at least multiple passes of nuclear magnetic resonance (NMR) measurement data measured at each of the depths of investigation, and wherein the measured signals have an initial signal-to-noise ratio;

increasing a signal-to-noise ratio of the measured signals by laterally stacking the multiple passes of the NMR measurement data to obtain the laterally stacked NMR measurement data having a higher signal-to-noise ratio than the initial signal-to-noise ratio;

performing a fluid volume analysis of the formation based upon the increased signal-to-noise ratio signals;

estimating a formation property of the subsurface formation based at least partially upon the fluid volume analysis, and providing the determined surface formation property to a user.

* * * * *